United States Patent [19]
Bonomo et al.

[11] 3,948,428
[45] Apr. 6, 1976

[54] DEVICE FOR COOLING WELDS

[75] Inventors: Franco Bonomo, Genzano; Fernando Caldarelli, Pomezia, both of Italy

[73] Assignee: Centro Sperimentale Metallurgico S.p.A., Rome, Italy

[22] Filed: July 16, 1973

[21] Appl. No.: 379,433

[30] Foreign Application Priority Data
Aug. 7, 1972 Italy.................................. 52036/72

[52] U.S. Cl..................................... 228/46; 219/73
[51] Int. Cl.²..................... B23K 9/18; B23K 25/00
[58] Field of Search .................. 228/46, 50; 29/487; 219/73, 126; 164/89, 283 S

[56] References Cited
UNITED STATES PATENTS
2,705,353   4/1955   Zeigler................................. 164/89
3,660,629   5/1972   Tunco Nakai et al................ 219/73

Primary Examiner—Ronald J. Shore
Assistant Examiner—Gus T. Hampilos
Attorney, Agent, or Firm—Young & Thompson

[57] ABSTRACT

Apparatus for cooling welds obtained by high heat input processes by the combined use of water and of gas, wherein the cooling water is brought into contact with the hot weld in a restricted zone located immediately under the molten bath, said zone having a ratio of its dimension transverse to the weld seam and the dimension parallel thereto, comprised between 10:1 and 1:1; and wherein the generated steam and the non evaporated water are immediately removed from the weld.

3 Claims, 3 Drawing Figures

DEVICE FOR COOLING WELDS

The present invention relates to an improved device for cooling welds, and more particularly this invention relates to a device suitable for the forced cooling, near the molten bath, of joints welded with high heat input processes.

The high heat input welding processes (electroslag, electrogas, submerged arc welding, with multiple wires, and so on) are, as is known, advantageous from the standpoint of productivity, and are used particularly for welding parts having considerable thicknesses. However both the high value of the heat input (about $10^6$ Joule/cm in the case of electroslag, joints of 50 mm thick steel plates), and the considerable mass of material involved in the process, and its relatively low thermal conductivity, form a great obstacle against the possibility of applying said processes. In fact, very low speeds of weld cooling are obtained, with the consequent formation of an extended, thermally altered zone, showing a coarse grain structure, characterized by a low fracture strength, a low ductility, and often also a low tensile strength. It is necessary, therefore, to apply a post weld heat treatment which, owing to the dimensions of the welded structure, is in most cases very expensive and in certain cases practically impossible.

In order to obviate these drawbacks some solutions have been proposed, and first that of spraying water on the welded zone in order to increase the cooling rate. However, in doing so, the released steam can enter the weld pool, producing blowholes and cracks in the seam. Recently, a device has been proposed, which should be able to eliminate these drawbacks and consisting of a welding shoe having a lower zone which extends obliquely from the plate surface. Two superposed rows of holes are provided in that zone; from the lower row water is sprayed while from the higher one, an inert gas is blown, having the purpose of removing the steam and preventing it from penetrating between the welding shoes and the weld. Said steam, however, while initially downwardly directed by the gas, towards a relatively cold zone, soon after moves upwards, surrounding the pieces to be welded and condensing on the upper part of the plate and on the electrode, reaching finally the weld pool, causing boiling in the bath and promoting the formation of inclusions, blowholes and cracks.

Moreover, such cooling causes movements of the edges of the pieces to be welded, often directed to close the gap existing between the pieces themselves, but sometimes, unpredictably also so as to further widen said gap.

It is impossible to anticipate exactly the amount of these movements, as they are related to a set of factors, namely amount of the heat input, welding speed, cooling rate, thermal conductivity of the pieces to be welded, etc., and their anticipation is too complex to be effectively practically studied. The result is that the welding process which is advantageous due to its high productivity, must be more often discontinued in order to prevent the welding device from being locked by the edges of pieces which are moving towards one another, and to readjust the sliding blocks which hold the molten bath.

Locking in position the pieces to be welded by means of clamps or other devices is often useless, if not harmful, as due to the enormous stresses originated by said movement, either the clamps will detach, or very harmful residual stresses remain in the welded piece, which can cause cracks in the welding seam.

The present invention aims to obviate the aforesaid drawbacks, by providing a device capable of ensuring an effective cooling of the welded zone (diminishing the extent of the thermally altered zone, and improving the mechanical features thereof); of preventing the developed steam or the water condensed therefrom from reaching the weld pool metal; and of avoiding the development of said stresses which cause the aforesaid movements of the edges to be welded.

When studying this problem, it has been surprisingly found that the mechanical features of the weld, its dimensional stability, the possibility of avoiding cracks and blowholes, the possibility of avoiding the occurrence of residual stresses, will be remarkably improved, reducing the area subjected to the action of the cooling water, quite contrarily to the results which could be directly predicted according to the theory and to the results effectively indicated by the prior art in this field.

The main characteristc of the present invention is therefore that the area of the zone to be welded subjected to the action of the cooling water is limited while obtaining a high cooling rate of the weld.

The present invention for cooling welds obtained by high heat input processes, by the combined use of water and gas, is characterized in that the cooled zone, which is immediately below the molten metal zone, is defined by a curtain of gas blown from nozzles present in the cooling shoes, and shows a ratio, between its own dimension crosswise to the weld seam and that parallel thereto, comprised between 10 : 1 and 1 : 1. Said gas, directed against the weld, preferably at an angle comprised between 15° and 50°, and under a 3 – 8 atm. pressure, entrains with itself — through suitable slots in the welding shoes — the steam formed by the evaporation of the water, as well as the non-evaporated water, inside the shoe, where said steam will condense in contact with the cooling water, and the resulting product is subsequently exhausted in a position remote from the weld.

The device will be disclosed in the specification as follows, which relates to a preferred embodiment, disclosed only by way of non limitative example, and shown in the drawings, where:

Figure 1:
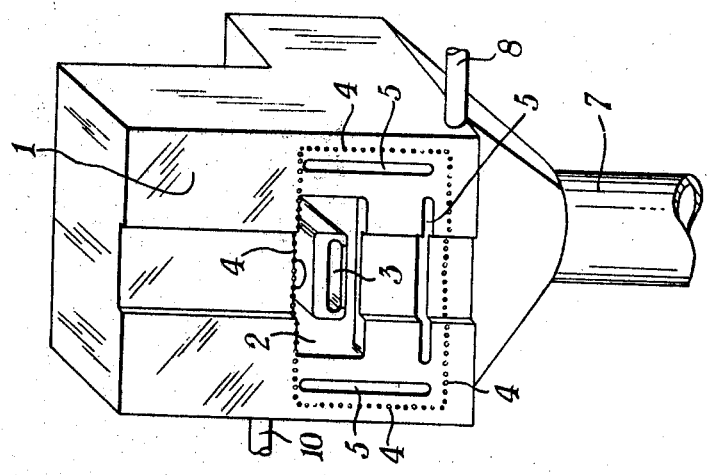
FIG. 1 is a perspective view of the device according to this invention.
Figure 2:
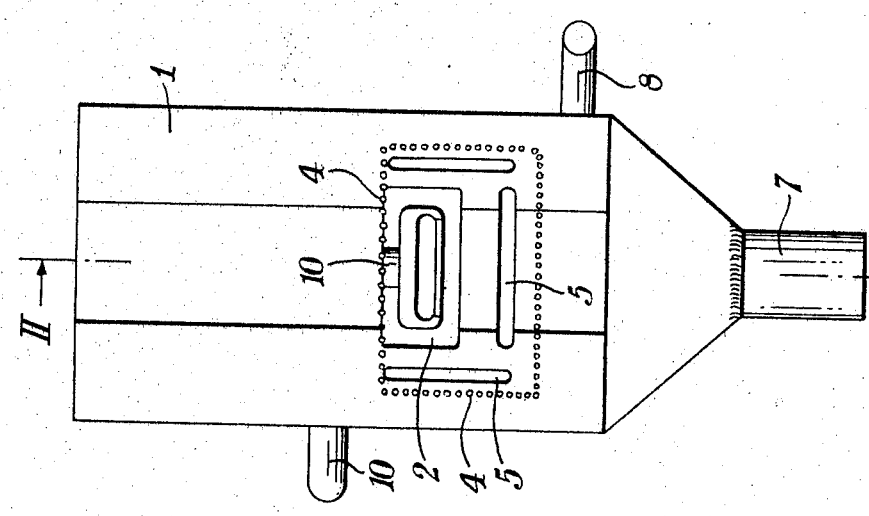
FIG. 2 is a front view of the surface of said device faced towards the welding.
Figure 3:
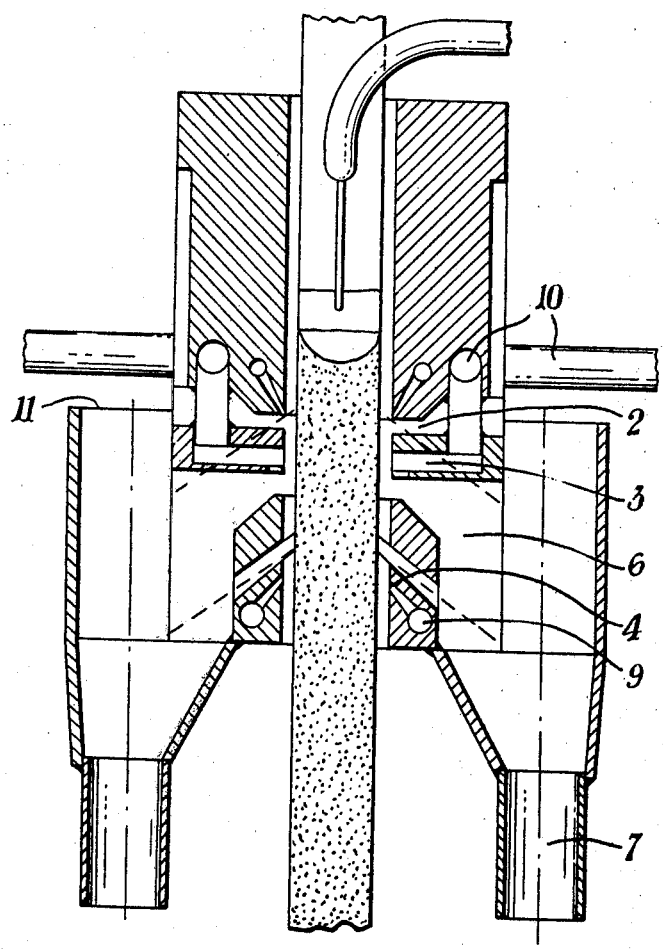
FIG. 3 is a section view of the weld and of the device, taken along the line II—II of FIG. 2, and arranged in a pair on both sides of the weld during the welding process.

With particular reference to the drawings it is to be noted that said device consists of a sliding block (two of which are arranged in a pair during the welding process so as to contain the molten bath) through the surface 1 of which, facing the weld, a main aperture 2 is provided, through which a nozzle 3, or other equivalent device extends, wherefrom the cooling water, coming from the duct 10, will be sprayed so as to hit the hot surface of the weld, cooling it.

Around said aperture 2, nozzles 4 are provided, at least a set of which is located on the upper edge of the aperture, the axes of said nozzles being inclined towards the aperture 2 itself, and inclined with respect to the surface 1 at a 15° – 50° angle. From said nozzles 4 a gas will be blown under a 2 – 8 atms. pressure, forming a barrier for the water sprayed by the nozzle 3 and for the steam formed by a part of said water when contacting the hot zone of the seam. The nonevaporated water and the steam will be entrained by the gas through the aperture 2 and the secondary slots 5 (provided through the surface 1 of the shoe in the space between the nozzles 4 and the aperture 2, and parallel to the sides thereof) inside the shoe, into a chamber 6 which communicates at its top through the aperture 11 with the atmosphere, and from said chamber the exhaust occurs through the duct 7.

The cited gas is supplied to the sliding block through the pipe 8 and by means of a distribution duct 9 is fed to the nozzles 4 which define an area (corresponding to the cooling zone on the weld itself) for which the ratio of the cross wise dimension with respect to the weld, and of the parallel dimension will be comprised between 10 : 1 and 1 : 1.

The present invention has been described with particular reference to a specific embodiment thereof, it being however to be understood that changes and modifications might be adopted without departing from the scope of the invention as defined by the appended claims.

We claim:

1. A device for cooling welding areas, comprising two hollow sliding blocks having confronting substantially flat surfaces to confine a molten metal bath of welding metal therebetween, each of said confronting surfaces having a main aperture opening therethrough, and each of said hollow sliding blocks having
   a main nozzle extending through said main aperture,
   a water supply duct connected with said main nozzle,
   a plurality of secondary nozzles opening through said surface in a continuous series that encloses a zone that surrounds said main aperture,
   a gas duct within said block for distributing a gas under pressure to said plurality of secondary nozzles,
   at least one slot through said surface within said zone surrounded by said plurality of nozzles for removing gas and steam and water from said zone and
   a collecting chamber within said block, said collecting chamber being in communication with said at least one slot and said main aperture and having an aperture at its upper end communicating with the atmosphere and an exhaust duct at its lower end.

2. A device as claimed in claim 1 said zone having a dimension transverse to the welding zone that is one to ten times the dimension of the zone parallel to the welding area.

3. A device as claimed in claim 1, said plurality of nozzles of each block converging in the direction of the other said block and being inclined at an angle of 15° to 50° to the associated said surface.

* * * * *